United States Patent [19]
Saidla

[11] 3,929,318
[45] Dec. 30, 1975

[54] STATIC MIXERS FOR VISCOUS MATERIAL
[75] Inventor: Glen E. W. Saidla, Hampton Falls, N.H.
[73] Assignee: Exxon Research & Engineering Co., Linden, N.J.
[22] Filed: Dec. 9, 1974
[21] Appl. No.: 531,062

[52] U.S. Cl. ................................................. 259/4
[51] Int. Cl.² ...................... B01F 5/06; B01F 15/02
[58] Field of Search ............... 259/4, 18, 36, 2, 1 R; 23/252 R; 138/38, 42

[56] References Cited
UNITED STATES PATENTS

| | | | |
|---|---|---|---|
| 3,051,453 | 8/1962 | Sluijters | 259/4 |
| 3,206,170 | 9/1965 | Schippers | 259/4 |
| 3,239,197 | 3/1966 | Tollar | 259/4 |
| 3,328,003 | 6/1967 | Chisholm | 259/4 |
| 3,394,924 | 7/1968 | Harder | 259/4 |
| 3,404,869 | 10/1968 | Harder | 259/4 |
| 3,406,947 | 10/1968 | Harder | 259/4 |
| 3,460,809 | 8/1969 | Hauss | 259/18 |
| 3,656,716 | 10/1972 | Lennart | 259/4 |
| 3,751,009 | 8/1973 | Archer | 259/4 |

Primary Examiner—Robert W. Jenkins
Attorney, Agent, or Firm—Donald F. Wohlers; Harold N. Wells

[57] ABSTRACT

A static mixer or interfacial generator is disclosed for quickly and effectively combining at least two components, at least one of which is extremely viscous, immediately prior to the chemical reaction of the components to form a foamed product. The mixing elements are so arranged as to provide multiple splitting of the components during a serpentine traversal through the mixer, resulting in an efficient mixing of the reacting components, promoting the formation of a uniform formed product. Immediately after mixing is complete the mixing elements are withdrawn from the mixing tube and a reamer traverses the tube to clean out residual reactants prior to the next mixing operation.

10 Claims, 7 Drawing Figures

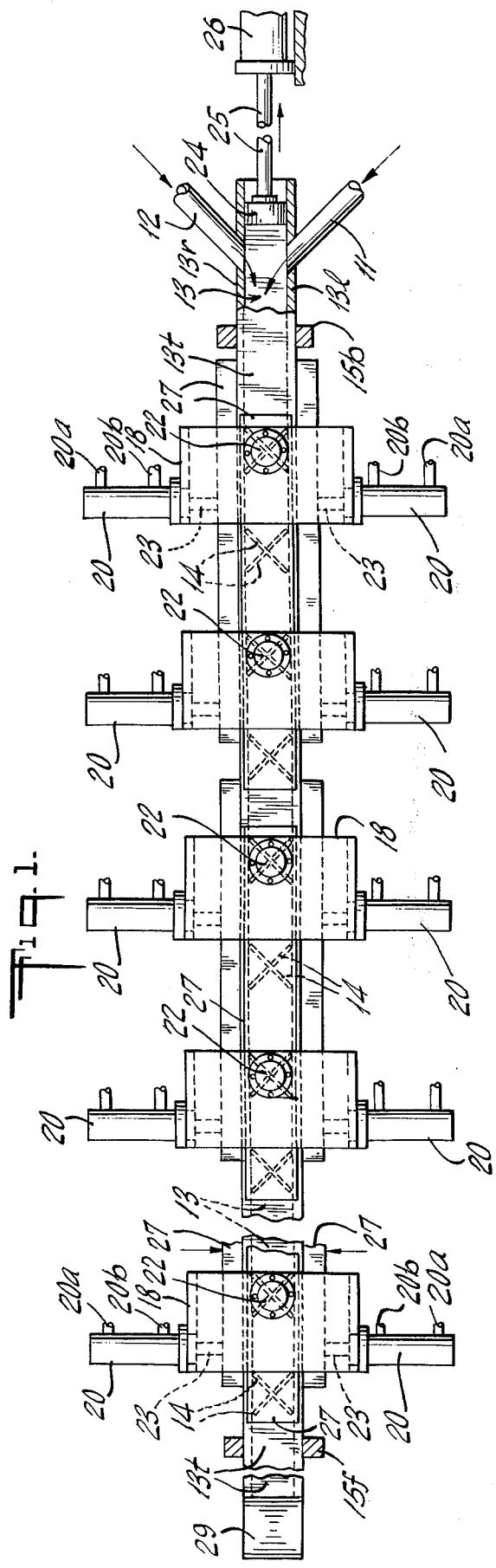
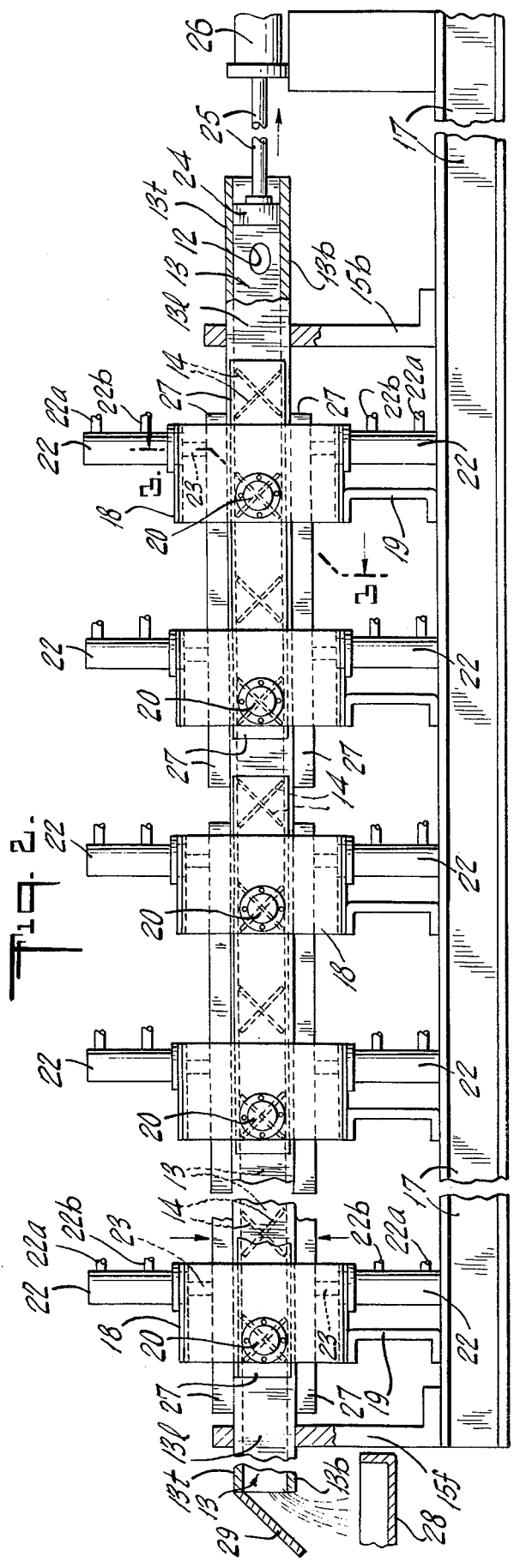

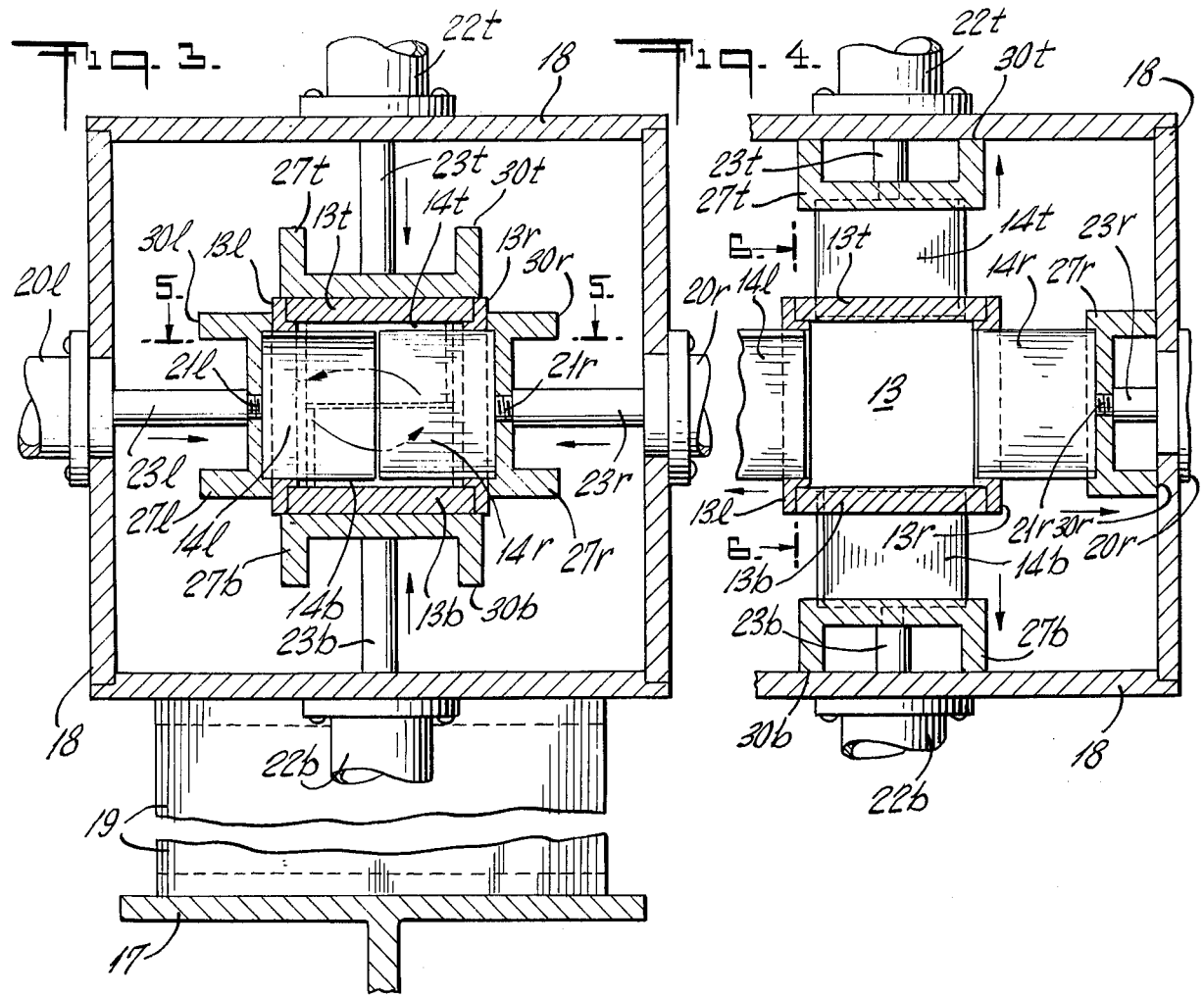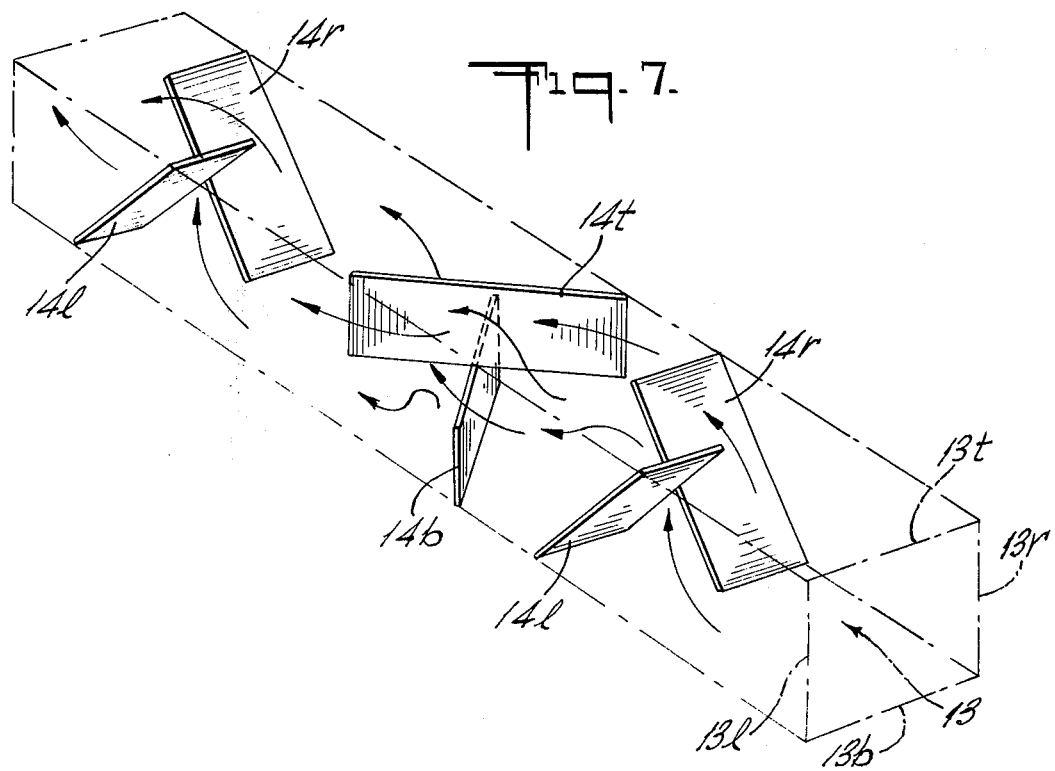

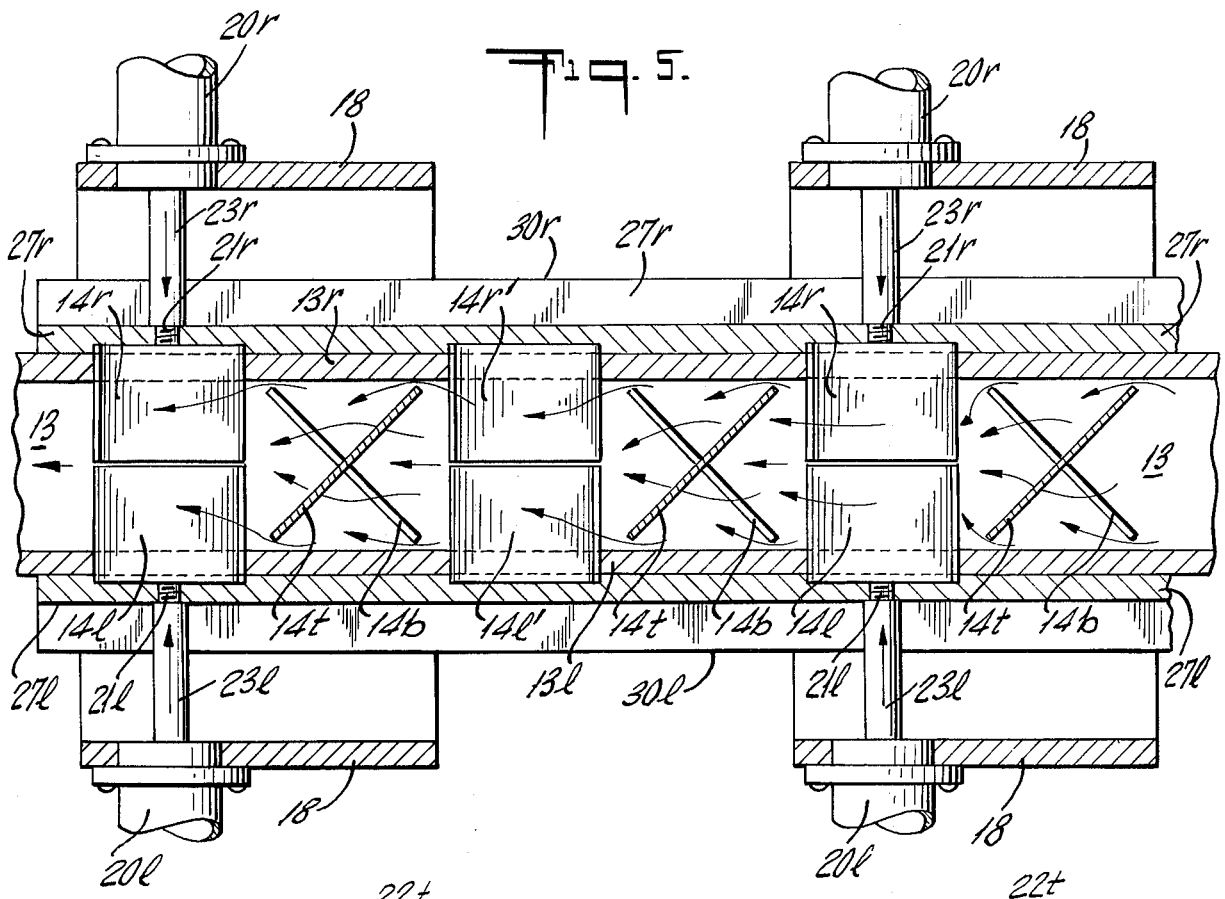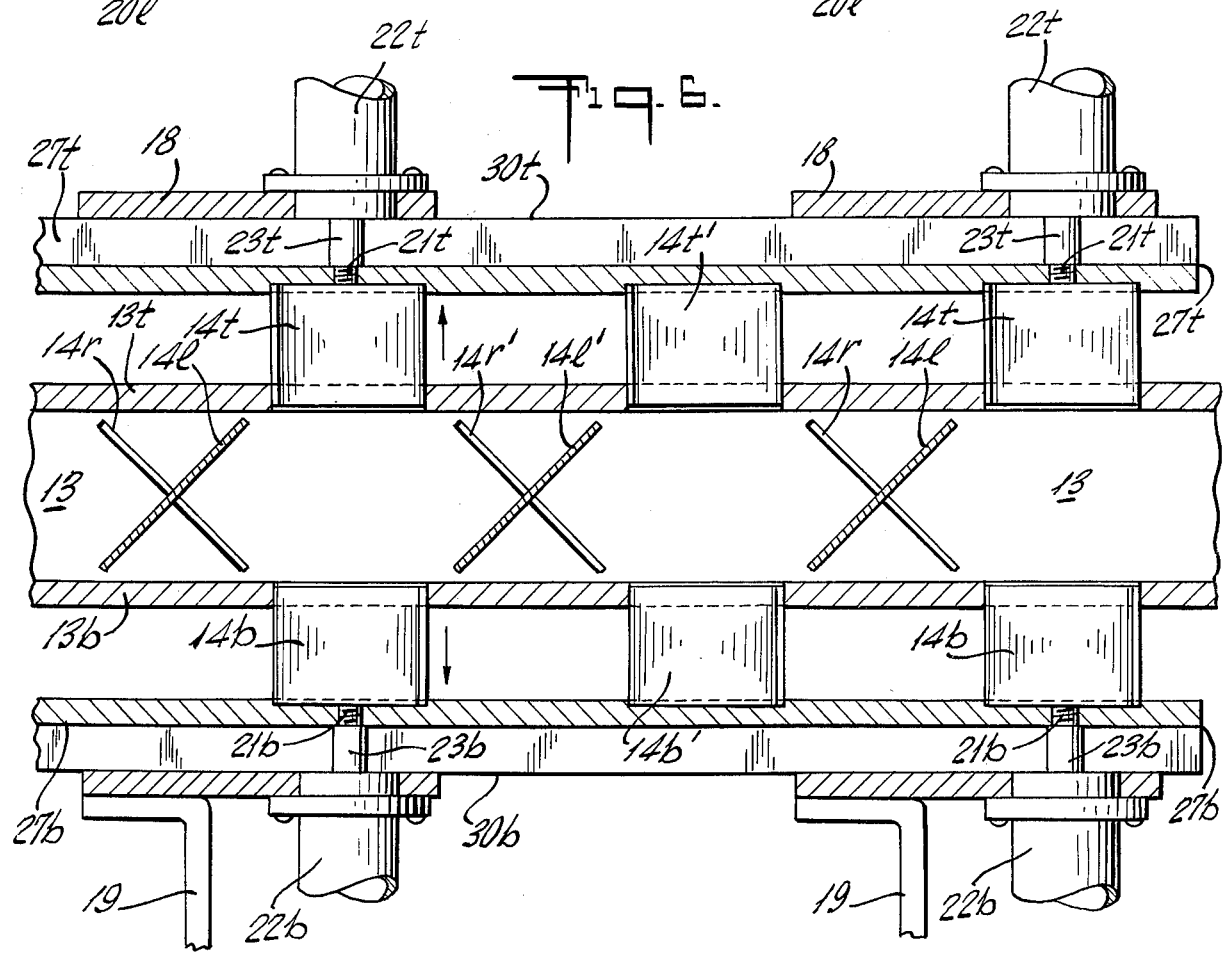

STATIC MIXERS FOR VISCOUS MATERIAL

BACKGROUND OF THE INVENTION

In U.S. Ser. No. 407,829 filed Oct. 19, 1973, a process is disclosed for incorporating selected fibers, typically glass fibers, into a foamed thermoplastic and creating an integral fiber reinforced skin on a molded foamed product. That application is incorporated by reference. As disclosed in the prior application, the reinforcing fibers are preslurried in a resin material, typically a polyurethane prepolymer and immediately prior to the formation of the final reacted mixture the remaining reactants are mixed in, that is, catalyst, foam stabilizer, blowing agent, or others. Immediately after mixing, the mixed reactants are distributed into a suitable mold and placed in a press where it is confined for a sufficient time at an appropriate temperature and pressure, causing the reactant mixture to form a foamed product which has an integral reinforcing of fibers. It will be appreciated that when reinforcing fibers are mixed with resin precursors an extremely viscous material results. Typically, in the case of polyurethane resins the material is a semi-solid of a putty-like, sticky consistency. Obviously, such a material is difficult to move and distribute into a mold but, more importantly, it is difficult to mix it with the reactant agent. However, this must be done, and done rapidly and effectively, in order for a uniform foamed product to result.

Other prior art from the polymer field has disclosed numerous designs for so-called static mixers or interfacial generators. Typical of such prior art patents are the following:

| U.S. 3,051,453 | U.S. 3,286,992 | U.S. 3,404,869 |
| --- | --- | --- |
| 3,182,965 | 3,328,003 | 3,406,947 |
| 3,195,865 | 3,358,749 | 3,506,244 |
| 3,206,170 | 3,382,534 | 3,704,006 |
| 3,239,197 | 3,394,924 | 3,751,377 |

From the discussion in the prior art patents, it will be found that creation of turbulence which is typical of a normal mixing process is not desired, or effective, or really possible in the polymer art where relatively viscous materials are handled. Instead, the approach taken by the prior art is not to use a rotating element which only mixes inefficiently and often generates destructive heat, but instead to employ a static mixer through which the reacting materials are forced. Little turbulence is created. Instead, the mixing is achieved by splitting and sub-dividing the main reacting streams, effectively spreading them out and creating large surface areas, then combining the streams again so as to provide relatively efficient mixing without turbulence and independent of the flow rate of the reacting streams. While such mixers are effective for the purposes for which they have been intended, they are not, however, suitable for mixing the reacting materials with which the referenced application was concerned. Since such a reacting mixture is ordinarily formed in a batch operation for supply to a mold, it will be appreciated that the residual reacting mixture will react within the mixer after the mold has been filled. This is typically within about 30 seconds but of course may be varied by use or non-use of catalysts and varying the reaction times of the foam components. Thus, the residual reacting mixture would foam and solidify, requiring disassembly of the mixer for cleaning. Clearly, such mixer configurations of the prior art would be ineffective with the sticky materials of the referenced application. What has been needed, but not heretofore available, is a static mixer which will effectively mix extremely viscous materials in a short period of time but which at the same time provides for efficient cleaning and recycling of the equipment in a typical commercial operation where batches follow one another with a relatively short interval between them. The prior art equipment has not been capable of performing such a mixing task but it can be accomplished by the static mixer of the present invention, to be disclosed and described in detail below.

SUMMARY OF THE INVENTION

The static mixer or interfacial generator of the invention provides good mixing for very viscous reacting materials and includes rapid and automatic self-cleaning of residual reactants after the batch has been mixed. In its preferred embodiment, the invention consists of an elongated tube through which the reactant materials are forced. Mixing is provided by a series of blades which are introduced into the reactant streams so as to provide multiple splitting of the reactant materials during a serpentine traversal of the tube. A substantial pressure drop is taken over the length of the mixing tube, often of the order of several hundred pounds per square inch. The well-mixed reactant materials exit the tube after being mixed for only about 3 seconds and are introduced immediately into or upon a mold where the reinforced foam product is formed. Immediately after filling the mold, feeding of the reactant materials is cut off, the mixing blades are retracted by mechanical operators thereby scraping the blades clean of reactant materials, and a hydraulically operated reamer or ram traverses the tube, pushing out the residual reactant materials and cleaning the tube before the reactants can foam and plug the reactant tube. After traversing the tube, the reamer is retracted and the blades reinserted by their mechanical operators in order to prepare the tube for the next batch of reactant materials. The broad outline of the operation of the apparatus of the invention will be more clearly understood from the detailed description of the preferred embodiments of the apparatus, which will be discussed below.

BRIEF DESCRIPTION OF THE DRAWINGS

FIG. 1 is a top plan view of the preferred embodiment of the invention.

FIG. 2 is a side elevation view of the embodiment of FIG. 1.

FIG. 3 is a sectional view taken substantially along line 3—3 of FIG. 2 with the blades in the closed mixing position.

FIG. 4 is a partial view of the section of FIG. 3, illustrating the blades in the retracted cleaning position.

FIG. 5 is a sectional view of FIG. 1, illustrating the blades in the closed mixing position.

FIG. 6 is a vertical section view of FIG. 2, showing the blades in the retracted cleaning position.

FIG. 7 is a perspective view showing the relative position of the blades and flow pattern through the mixer tube of the invention.

DESCRIPTION OF THE PREFERRED EMBODIMENTS

FIG. 1 is a plan view of the preferred embodiment of the invention. Although one form of physical structure is shown, it will be appreciated that the invention should not be limited strictly to the specific embodiments shown here, but may be modified extensively while still within the spirit of the invention. When preparing foamed plastic articles according to the referenced application, it is necessary to introduce resin precursors premixed with fiberglass or other reinforcing material into the mixer simultaneously with a catalyst (if desired), blowing agents, and other ingredients as desired. These reactant materials must be mixed thoroughly and rapidly since within a very short period of time they will begin to react. Accordingly, they must be quickly placed in the mold immediately after mixing so the foaming process may occur therein. The mixing chamber of the present invention normally will appear as an elongated tubular body, shown generally as 10 in FIG. 1. A first reactant entry passageway 11 is operatively connected at the inlet end of the tubular body. Into entry way 11 one of the two principal reactants is forced under rather high pressure. The second reactant entry passageway 12 receives the second mixture of materials required to form a complete foam generating mixture. These materials are also introduced into the passageway 13 at relatively high pressure. It should be noted that the high pressure developed at this point, which is primarily provided by pumps (not shown) results from the extremely large pressure drop required to force passage of the reactants through the passageway 13. While in the process of the referenced application only two principal entry ports are used, it will of course be clear that additional entry ways could be used in reactant systems having more separate ingredients. The first and second reactant mixtures traverse the tubular body 10 where they are mixed by blades 14 which enter in pairs, in a vertical or horizontal direction. A detailed discussion of the mounting and operation of these blades 14 will be deferred until later. After traversing passageway 13 and being mixed by the mixing blades 14, the resulting thoroughly mixed reacting ingredients exit the passageway 13 through exit 16, from which they are passed directly into the mold (28 in FIG. 2) where the foaming reaction takes place. While mold or platten 28 has been shown in FIG. 2 as a single plate, those skilled in the art will readily appreciate that the discharge end 16 of passageway 13 could be arranged to directly inject the reactant mixtures under pressure into other forms of mold cavities.

In the typical application of the mixer of the invention, reactant mixtures are provided to molds having fixed capacities. Thus, a mixing and delivery operation is an intermittent one or batch type of operation. Once sufficient material has been mixed and distributed to the mold, it will be clear that the mixture present in the mixer itself may also foam and set in place, essentially making the mixer inoperative. In order to overcome this difficulty, the mixer blades have been provided with operators (in the form of hydraulic actuators) which can retract them from their normal mixing position, opening the main passageway 13. Once the passageway is open, reamer 24 is passed completely through the passageway, driven by an operator 26 through shaft 25. Once the reamer 24 has passed through the passageway and discharged the residual reaction mixture, the reamer 24 can be withdrawn and the mixing blades 14 moved into the normal operating position within the passageway 13, whereafter the cycle may be repeated. Operators 20 for the horizontally traversing blades 14 can be most clearly seen here in this plan view. They as well as the vertical operators 22, are attached to a surrounding frame 18 which serves several functions, one of which is to mount the operators 20 and 22. This structural support 18 is more clearly seen in FIG. 2 where it is seen to be essentially a square frame concentric with the main passageway 13. Frame 18 in turn is supported by intervening supports 19, which are attached directly to the main frame 17, which in turn supports the entire mixer. Frame 17, acting through supports 15b and f, also serves to support the main passageway 13, independently of the support frame 18 for the horizontal and vertical operators, 20 and 22 respectively. The elevation view of FIG. 2 shows substantially the same features as that of the plan view of FIG. 1. Instead of the horizontal operators 20 shown in FIG. 1, the vertical operators 22 can be seen in the view of FIG. 2. In this view a deflector plate 29 is shown attached to the outlet of passageway 13 for directing the mixed reactants into the desired location on the mold 28.

Turning on the sectional view of FIG. 3, the arrangement and function of the blades and their operators can be more clearly seen. The main frame 17 acting through intervening frame 19 supports the square-shaped frame 18 which supports and acts as a fixed point against which the operators can exert a force to move the blades 14. In the typical embodiment shown in FIG. 1 there may be sets of operators working together to engage a plurality of blades. There will typically be an operator which forces blades set at the top into a vertical movement, either up or down, and this operator is opposed by a mating vertical operator directly beneath which moves a second blade in the vertical direction in conjunction with the upper operator. These operators move their blade or blades at the same time its paired blade or blades is moved. Only two positions are generally needed: (1) closed for mixing, and (2) open for cleaning. As is illustrated in FIG. 3, when the blades 14 are closed the upper vertical operator 22*t* forces blade 14*t* in a downward direction, acting through shaft 23*t* and the supporting bracket 27*t*. At the furthest point of its travel, one edge of the blade 14*t* is approximately at the center line of the mixer. Its paired blade 14*b* is moved upward by its operator 22*b*, acting through shaft 23*b* and support bracket 27*b* on which the blade is mounted. At the extremity of its travel, the outer edge of the blade 14*b* also is approximately at the center line of the mixer so that the blades touch, or nearly so. These blades 14*t* and *b* do not block the passageway 13 for they are turned, preferably at a 45° angle, although other angles might be used. Each blade is 45° from the longitudinal axis of passageway 13 but blade 14*t* is directed 90° from blade 14*b*, and accordingly space is provided between the two blades, which forces the reactant mixture to divide and to make 90° turns, producing substantial pressure drop and mixing the reactants. Positioning of the blades is perhaps most clearly seen in FIG. 7.

The discussion of the operation of the vertically mounted blade also pertains to the corresponding pair of horizontally mounted blades, 14*l* and 14*r* for convenience. 14*l* is mounted on supporting bracket 27*l* and moved by intermediate shaft 23*l* by operator 20*l* mounted directly on frame 18. Its paired blade, 14r, is mounted on bracket 27r which is moved through intermediate shaft 23r by operator 20r. As in the case of the vertical blades, the horizontal blades 20l and 20r have two operating positions: (1) closed for mixing and (2) open for cleaning. Again, as in the case of the vertically mounted blades, the blades 20l and 20r are mounted on their respective support brackets 27 at a 45° angle to the direction of flow, but directed normal to each other. Since these blades are horizontal, however, the flow direction through them is substantially different from that of the vertically mounted blades. This will be appreciated from FIG. 7.

In the partial sectional view of FIG. 4, the blades are fully retracted, that is, open for cleaning. Flush with or slightly recessed into the passageway walls, a clear passage is left for the passage of reamer 24 through the passageway 13 to cleaning. After it has been cleaned, the blades 14 can be moved by their respective operators 20 or 22 into the closed position before the mixing of another batch of reactant materials. It should be noted that the art of retraction of each of the mixer blades through its access slot in the wall of the passageway 13 is effective to scrape all residual adhering material from the blades; such material remaining within the passageway to be removed by the reamer 24. Therefore, when the blades are repositioned into their mixing position, they and the passageway are in a cleaned condition.

Referring to FIG. 5, which is an enlarged view of a portion of FIG. 1, it can be seen that horizontal operators may be used to move more than a single set of blades. In this embodiment, left and right operators 20l and 20r not only operate the blades 14l and 14r shown directly aligned with the operator shafts, but also operate an intermediate pair of blades 14l' and 14r' which are also attached to supporting bracket 27, which may be a lengthy bracket supporting two or more (here three) sets of blades. It will be appreciated that the arrangement of blades and operators is primarily a matter of mechanical design, having to do with physical space availability as well as force which is required to extend or retract the blades. If the blades are to be placed rather closely spaced in the passageway 13, then it may be mechanically convenient for the blades to be mounted in multiples on rather lengthy support brackets 27.

FIG. 6 is a section of the view of FIG. 2. The open for cleaning position is illustrated wherein the blades have been fully retracted by the operators 22 until they are slightly within the walls of passageway 13, thus opening the passageway 13 for cleaning by reamer 24.

While the foregoing figures illustrate the mechanical configuration which has been successfully applied in commercial operations for mixing the heavy reactants discussed in the referenced application, the actual flow pattern can be best appreciated by the perspective view of FIG. 7. There, two horizontal sets of blades 14l and 14r are shown with a vertical set of blades 14t and 14b between them. It will be appreciated that in the preferred configuration vertical and horizontal sets of blades would be positioned one after the other in order to obtain efficient mixing. It can be visualized that the reactant materials enter as two substantially independent streams which fill the passageway 13. As the first set of horizontal blades 14l and 14r is reached, half of the material will be forced in a downwardly direction, at a 45° angle, makes a 90° turn to pass under the right-hand blade, then making another 90° turn as it contacts the passageway wall. While this is occurring, the right-hand half of the reactant mixture is forced in a 45° upward direction until, blocked by the right-hand passageway wall and the top of the passageway and the left-hand blade, it must make a 90° left-hand turn until, again being obstructed by the passageway wall, and it must turn 90° again. Generally speaking, this single set of blades will divide the flow in half and force each half stream through a constricted passageway and two 90° turns being substantially displaced in their position in the passageway 13. The stream which passed under the first set of horizontal blades is now travelling near the lower right portion of the passageway 13 until it intersects blade 14b which forces it to move in a 45° direction along the blade until it contacts the right-hand wall of the passageway, where, being trapped between the blade 14b and the passageway the stream must then pass 90° in an upward direction until it is forced by the upper passageway wall to turn 90° again and travel then along the upper right-hand corner of passageway 13. The stream which passed through the upper opening between the first two horizontal blades travels after leaving those blades primarily in the upper left-hand part of passageway 13, which it continues to do until it reaches the upper vertical blade 14t which blocks the passageway and forces the reactant stream to pass 90° downward through the space between the upper and lower blades 14t and 14b until the stream contacts the bottom of passageway 13, when it must make another 90° turn and then travels in a direction substantially axially of passageway 13. The net effect of these two sets of blades has been to effectively rotate the right and left hands of the entering stream so that they now are travelling, the left-hand stream in the upper portion of passageway 13, and the right-hand stream in the bottom portion of passageway 13. Of course, in the process of making these transitions, described here as if they were single streams, a substantial intermixing of the two streams which have been introduced into passageway 13 is achieved. However, in a general way, it is considered that the right half of the entering stream is now travelling along the upper portion of passageway 13 as it contacts the third and last set of horizontal blades shown in FIG. 7. It will be clear that the fluid will be split again, and half of the stream will pass around the right-hand blade and the other portion will be forced downwardly into the space along the bottom of passageway 13. At the same time, the stream passing along the bottom half of passageway 13 will also be split, half being moved up to combine with half the upper stream and the remaining half stream joining a half portion of the upper stream. It will be appreciated that as this process continues the reactant streams will be continually divided and recombined so that substantially complete mixing is achieved. In a typical commercial mixer, perhaps 12 or more sets of paired blades will be used. In any specific application, the number of blades would be chosen to achieve the degree of mixing desired. It will be recalled that a substantial pressure drop in the order of 750 psi is typical when mixing highly viscous reactive materials such as are disclosed in the referenced application. Given the serpentine path which is forced on these materials by the interaction of the vertical and horizontal blades, it will be appreciated that substantial pressure drops are involved when highly viscous materials are mixed. Some variation of the pressure drop would be expected depending upon the materials to be mixed, but even for a single reactant mixture adjustment of pressure drop could be made by changing the size of passageway 13, the dimensions of the blades, and their axial spacing.

The foregoing discussion of the mechanical construction of a preferred embodiment is for purposes of illustration of the invention and should not be considered to limit its scope, which is defined by the claims which follow.

What is claimed is:

1. A static mixer for mixing at least two fluid streams comprising:
   a. a straight tubular hollow elongated body member providing a mixing passageway for said fluid streams and having an inlet end for receiving said streams and an outlet end for discharging said streams after mixing therein, said passageway having slot openings through the walls thereof;
   b. a first inlet means communicating with said inlet end of said body member for introducing a first fluid stream into said body member;
   c. a second inlet means communicating with said inlet end of said body member for introducing a second fluid stream into said body member;
   d. at least one pair of retractable mixing blade means, each of said blade means disposed in a plane normal to the walls of said passageway and at an angle from the longitudinal axis thereof, each of said planes intersecting the other and defining a line of intersection passing through said longitudinal axis, said mixing blades being disposed to obstruct a straight line through said body member, but to provide a plurality of serpentine passageways therethrough;
   e. at least one pair of operator means connected to each pair of mixing blades of (d) for moving said blades normal to the adjacent walls of said body member into the abutting relationship of (d) and retracting said blades away from said abutting relationship through said slot openings of (a) provided in said body member walls whereby said blades may be entirely removed from obstructing the passageway through said body member.

2. The static mixer of claim 1 further comprising a reamer means for traversing said passageway when said blades are retracted through said walls for removing residual fluid stream deposits therefrom.

3. The static mixer of claim 2 further comprising operating means for said reamer means.

4. The static mixer of claim 1 having at least two pairs of said moveable mixing blades and spaced along the longitudinal axis of said passageway, one of said pairs of blades having the common line of intersection of the associated planes normal to the common line of intersection of the second of said pair of blades.

5. The static mixer of claim 4 wherein at least ten pairs of said moveable mixing blades are dispersed along the longitudinal axis of said passageway.

6. The static mixer of claim 4 wherein each blade of said pairs of moveable mixing blades is a rectangular flat blade, each blade abutting the other blade at a point along one edge thereof.

7. The static mixer of claim 1 wherein each of said mixing blade means can be retracted by a retraction means disposed in fixed relation to said body member, whereby said passageway can be cleared of the blade means to provide an open conduit and thereby to facilitate removal of residual fluids remaining therein.

8. A static mixer for mixing a fluid stream comprising:
   a. a hollow elongated body member providing a mixing passageway for said fluid stream and having an inlet end for receiving said stream and an outlet end for discharging said stream after mixing therein, said passageway having slot openings through the walls thereof;
   b. at least two mixing blade means, each of said blade means being disposed in a plane substantially normal to the walls of said passageway and at an angle from the longitudinal axis thereof, said mixing blades being disposed to obstruct a straight line fluid flow through said body member and provide a serpentine passageway therethrough; and
   c. operator means connected to said mixing blade means for retracting said blade means through said slot openings in said body member walls whereby said blades are scraped clean and entirely removed from obstructing the passageway through said body member.

9. The static mixer of claim 8 further including a ram means for traversing said passageway when said blades are retracted through said walls for removing residual fluid stream deposits therefrom.

10. The static mixer of claim 9 wherein said body member is rectangular in cross section.

* * * * *